UNITED STATES PATENT OFFICE.

CHARLES E. ACKER, OF NIAGARA FALLS, NEW YORK, ASSIGNOR, BY MESNE ASSIGNMENTS, TO MARCUS STINE, OF NEW YORK, N. Y.

REFINING CARBON TETRACHLORID.

No. 875,232.   Specification of Letters Patent.   Patented Dec. 31, 1907.

Application filed January 8, 1906. Serial No. 295,051.

*To all whom it may concern:*

Be it known that I, CHARLES E. ACKER, a citizen of the United States, residing at Niagara Falls, in the county of Niagara and State of New York, have invented a new and useful Improvement in Refining Carbon Tetrachlorid, of which the following is a specification.

Carbon tetrachlorid prepared in the usual ways, particularly in all processes which involve the use of sulfur or sulfur compounds, and even after purification by many of the methods heretofore in use, usually retains varying amounts of impurities, generally containing sulfur, which impart to the carbon tetrachlorid an evil odor, which may manifest itself at once, or after some time, as by storing in cans. These impurities are also objectionable in many of the applications of carbon tetrachlorid, as, for instance, when it is used for the extraction of fats and oils.

I have invented a new and useful method of removing these impurities, either from crude carbon tetrachlorid, or from impure carbon tetrachlorid, which has been imperfectly refined or purified by many of the well known ways, as by agitation with caustic potash or caustic soda solution. It consists in treating the carbon tetrachlorid, preferably partially purified by any of the well known means, with an aqueous solution of hypochlorous acid or a salt of hypochlorous acid, as sodium, potassium or calcium hypochlorite, until the impurity is destroyed; the essential feature of the process consisting in reacting upon the impurities with a reagent containing the hypochlorous radical, or, in other words, the radical of hypochlorous acid. It will be understood from the above that the chemical reaction resulting in the purification of the carbon tetrachlorid is due to the reaction between the radical of hypochlorous acid content of the reagents above referred to and the impurities associated with the carbon tetrachlorid.

In my preferred method of application I place the carbon tetrachlorid preferably partially purified by previously agitating with caustic soda solution, in a vessel, provided with a suitable agitating or stirring device, and connected to a reflux condenser to prevent any loss by evaporation, I then run in an aqueous solution of calcium hypochlorid (ordinary bleach liquor) containing about 6% of available chlorin and a little free alkali, then agitate until a sample of the carbon tetrachlorid shows the desired purity. If necessary the agitation may be stopped, allowing the specifically heavier carbon tetrachlorid to sink to the bottom, and exhausted bleach liquor be run off, or to be siphoned off, and replaced by fresh bleach liquor. I usually prefer to add the bleach liquor in portions in this way, as I find it usually to be more economical. Finally after all the impurity has been destroyed, the carbon tetrachlorid may be allowed to settle, and can then be run off, but I prefer to heat the containing vessel and distil off the carbon tetrachlorid together with a little water, condense and collect in a suitable receiver and allow the carbon tetrachlorid to separate from the water by gravity. By this means carbon tetrachlorid of a very pure odor, and entirely free from impurity may be readily and economically prepared. I prefer to agitate at a temperature of about 35° C., although the process works well at a wide range of temperatures, but I find that it is most rapid and economical at about 35°C.

Having now described my invention, and preferred method of application what I claim and desire to have protected by Letters Patent is:

1. In the process of purifying carbon tetrachlorid, the step of reacting upon the same with a solution of a reagent containing the hypochlorous radical.

2. In the process of purifying carbon tetrachlorid, the step of reacting upon the same with an aqueous solution of a reagent containing the radical of hypochlorous acid.

3. The process of refining impure carbon tetrachlorid which consists in acting upon it with an aqueous solution of a reagent comprising the radicle of hypochlorous acid at a temperature of about 35° C. until the impurity is destroyed.

4. The process of refining impure carbon tetrachlorid which consists in acting upon it with an aqueous solution of a reagent comprising the radicle of hypochlorous acid at a temperature of about 35° C. until the impurity is destroyed, and distilling off the pure carbon tetrachlorid from the reaction mixture.

5. The process of refining impure carbon tetrachlorid, which consists in acting upon it with an aqueous solution of calcium hypochlorite.

6. The process of refining carbon tetrachlorid which consists in acting upon it with an aqueous solution of calcium hypochlorite at a temperature of about 35° C., until the impurity is destroyed.

7. The process of refining carbon tetrachlorid which consists in acting upon it with an aqueous solution of calcium hypochlorite at a temperature of about 35 C. until the impurity is destroyed, and distilling off the pure carbon tetrachlorid from the reaction mixture.

CHARLES E. ACKER.

Witnesses:
 GOULD ALLEN,
 CHARLES C. RICE.